United States Patent [19]

Breed et al.

[11] Patent Number: 5,322,325
[45] Date of Patent: Jun. 21, 1994

[54] SAFING VELOCITY CHANGE SENSOR

[75] Inventors: Allen K. Breed, Boonton Township Passaic County; Ted Thuen, Morris Plains; Carl T. Grossi, Wharton, all of N.J.

[73] Assignee: Breed Automotive Technology, Inc., Lakeland, Fla.

[21] Appl. No.: 8,837

[22] Filed: Jan. 25, 1993

Related U.S. Application Data

[63] Continuation of Ser. No. 765,016, Sep. 24, 1991, abandoned, and a continuation-in-part of Ser. No. 423,871, Oct. 19, 1989, Pat. No. 5,005,861.

[51] Int. Cl.$^5$ .................. H01H 35/14; G01P 15/135
[52] U.S. Cl. .................. 280/735; 200/61.53
[58] Field of Search .................. 280/734, 735; 200/61.45 R, 61.52, 61.48, 61.49, 61.53, 61.51; 180/282

[56] References Cited

U.S. PATENT DOCUMENTS

| | | | |
|---|---|---|---|
| 3,623,449 | 11/1971 | Knutson | 200/61.53 |
| 3,673,367 | 6/1972 | Kaiser | 280/735 |
| 3,750,100 | 7/1973 | Ueda . | |
| 3,778,572 | 12/1973 | Matsui et al. | 200/61.49 |
| 4,164,263 | 8/1979 | Heintz et al. | 280/735 |
| 4,438,424 | 3/1984 | Yasui | 280/735 |
| 4,700,973 | 10/1987 | Gademann et al. | 280/735 |
| 4,816,627 | 3/1989 | Janotik | 200/61.53 |
| 4,851,705 | 7/1989 | Musser | 280/735 |
| 4,857,680 | 8/1989 | Janotik | 200/61.53 |
| 5,005,861 | 4/1991 | Breed | 280/734 |
| 5,012,050 | 4/1991 | Sewell | 200/61.53 |
| 5,031,931 | 7/1991 | Thuen et al. | 280/735 |
| 5,059,751 | 10/1991 | Woodman et al. | 280/735 |
| 5,098,122 | 3/1992 | Breed et al. | 280/735 |

FOREIGN PATENT DOCUMENTS

| | | |
|---|---|---|
| 537306 | 5/1922 | France .................. 200/61.53 |
| 2236619A | 4/1991 | United Kingdom . |
| 2236621A | 4/1991 | United Kingdom . |
| WO9000482 | 1/1990 | World Int. Prop. O. . |

Primary Examiner—Karin L. Tyson
Attorney, Agent, or Firm—Kane, Dalsimer, Sullivan, Kurucz, Levy, Eisele & Richard

[57] ABSTRACT

A safing sensor for sensing velocity changes particularly suited for passenger restraint systems in a motor vehicle for the deployment of an air bag includes a housing with contact blades and an inertial element. The movement of the inertial element is substantially undamped within the housing. Preferably, the sensor includes mounting tabs for mounting said housing on a printed circuit board.

12 Claims, 7 Drawing Sheets

SAFING VELOCITY CHANGE SENSOR

RELATED APPLICATIONS

This is a continuation of copending application Ser. No. 07/765,016 filed on Sep. 24, 1991, now abandoned, and a continuation-in-part application to application Ser. No. 423,871 entitled "A Velocity Change Sensor with Double Pole Sensor" filed Oct. 19, 1989 and now U.S. Pat. No. 5,005,861. The subject matter of this application is further related to the following commonly assigned applications.

| TITLE | Ser. No. PATENT NUMBER | FILED |
| --- | --- | --- |
| A VELOCITY CHANGE SENSOR WITH SPRING BIAS | 447,108/5,91,931 | 12/6/89 |
| A VELOCITY CHANGE SENSOR WITH CONTACT RETAINER | 417,914/5,011,182 | 10/6/89 |
| VELOCITY CHANGE SENSOR WITH MAGNETIC FIELD CONCENTRATOR AND DIRECTOR | 418,147 (ABANDONED) | 10/6/89 |
| A VELOCITY CHANGE SENSOR WITH IMPROVED SPRING BIAS | 587,262/5,098,122 | 9/24/90 |

BACKGROUND OF THE INVENTION

1. Field of the Invention

This invention pertains to a velocity change sensor or accelerometer used in motor vehicles for detecting sudden changes in velocity and for activating in response a passenger restraining system such as an air bag system. More particularly, this invention pertains to a safing sensor which includes an element which moves to a preset position in response to a sudden deceleration to activate a pair of contact blades.

2. Background of the Invention

Studies have been made which indicate that injuries in motor vehicle accidents, especially at high speeds, can be substantially reduced or eliminated by the use of passenger restraint systems. (The term "passenger" is used to cover the driver of a car as well.) These systems include an inflatable balloon usually termed an air bag which normally is stored away in the instrument panel or the steering wheel. When the motor vehicle is subjected to a sudden deceleration, the air bag is inflated and is deployed automatically in a position which cushions the passengers, restrains their movement and prevents contact between them and the automobile interior such as the windshield, the steering wheel, the instrument panel and so on. Of course, a crucial element of all such systems is the velocity change sensor or accelerometer which initiates the inflation and deployment of the air bags. The motion of the motor vehicle must be carefully and precisely monitored so that the air bags can be deployed very fast, before the passengers suffer any substantial injury.

A velocity change sensor is disclosed in U.S. Pat. No. 4,329,549 assigned to the same company as the present invention. This sensor comprises a tubular housing surrounding a metallic shell, a metal ball and a magnet biasing the ball toward a first end of the shell. At the second end of the shell there is a pair of electrical contact blades. The sensor is positioned in the motor vehicle in an orientation such that when the motor vehicle experiences a deceleration which exceeds a preset level, the ball moves from the first toward the second end, making contact with the two blades. Because the blades and the ball are made of electrically conducting material, when the ball contacts the blades, an electrical path is established between the two blades. This electrical path is used to initiate a signal for the deployment of the air bags.

A problem associated with the prior art concerns the safety of the system. While the deployment of an air bag during a crash is critical to insure the protection of the passenger, prevention of a false deployment is equally critical. Once an air bag is deployed, it seriously impairs the movement of the driver. Therefore, if an air bag is falsely activated, i.e. while the vehicle is moving and is not involved in a serious accident, rather than protecting the driver, the air bag may actually hamper him or her from proper operation of a vehicle.

OBJECTIVES AND SUMMARY OF THE INVENTION

In view of the above mentioned disadvantages of the prior art, it is an objective of the present invention to provide a restraint system with an inexpensive safing sensor which provides redundancy for the operation of the restraint system.

A further objective is to provide a restraint system with a safing sensor in which an inertial moving element causes a contact between two electrical contact blades substantially, simultaneously.

Other objectives and advantages of the invention shall become apparent from the following description. An accelerometer constructed in accordance with the invention includes a housing with at least one pair of contact blades; and an inertial element moving in a predetermined path in response to a change in velocity of the motor vehicle. The two contact blades are disposed in the path of the moving inertial element in such a manner that a direct electrical path is established through the contact by the element. In one embodiment, a crash is sensed when an electric contact is established through the inertial element. In another embodiment, one contact is bent under the influence of the inertial element to touch another contact. Importantly, the movement of the inertial element is undamped to insure a quick operation for the sensor.

DETAILED DESCRIPTION OF THE INVENTION

Figure 1:
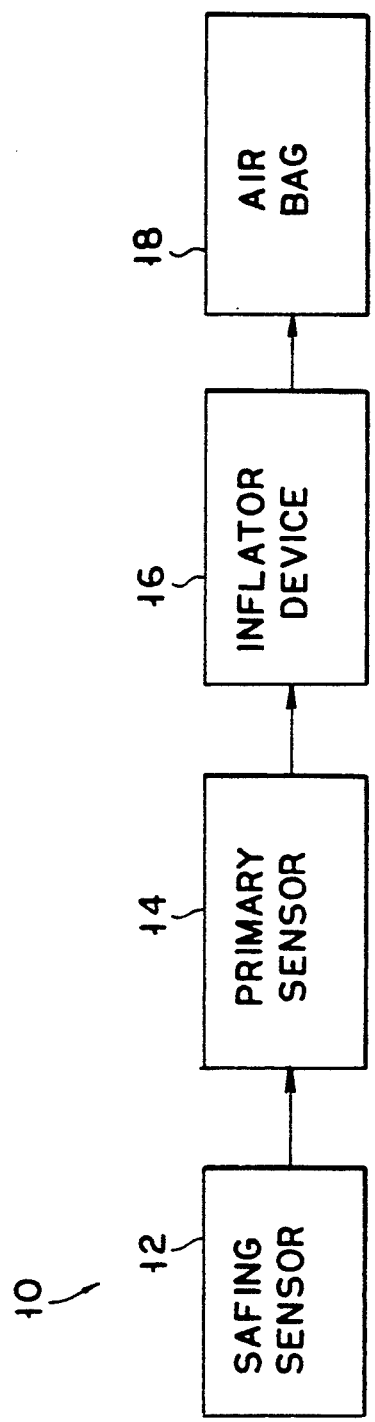
FIG. 1 shows a block diagram for a restraint system constructed in accordance with this invention.

To illustrate more clearly the operation of a safing sensor, reference is now made to FIG. 1 wherein a block diagram of a passenger restraint system 10 is shown, said restraint system including a safing sensor 12 coupled to a primary or discriminating sensor 14. Primary sensor 14 in turn triggers an inflator device 16 for inflating an air bag 18. The primary sensor 14 may be a damped sensor constructed and arranged to discriminate between crashes, and more particularly to differentiate between lo speed and high speed crashes.

Turning now to the remaining Figures, a safing sensor 12 constructed in accordance with this invention is usually mounted on the motor vehicle (not shown).

The sensor has a tubular portion 20 terminating with a flared end 22 and an open end 24 closed by a potting material. Alternatively, the junction between plug 28 and end 24 may be sealed by other means. A plug 28 is disposed adjacent to potting 26 as shown, with a spherical depression 30. The tubular portion 20 is preferably made of a plastic material, and holds an inertial element such as a metal ball 34.

Figure 2:
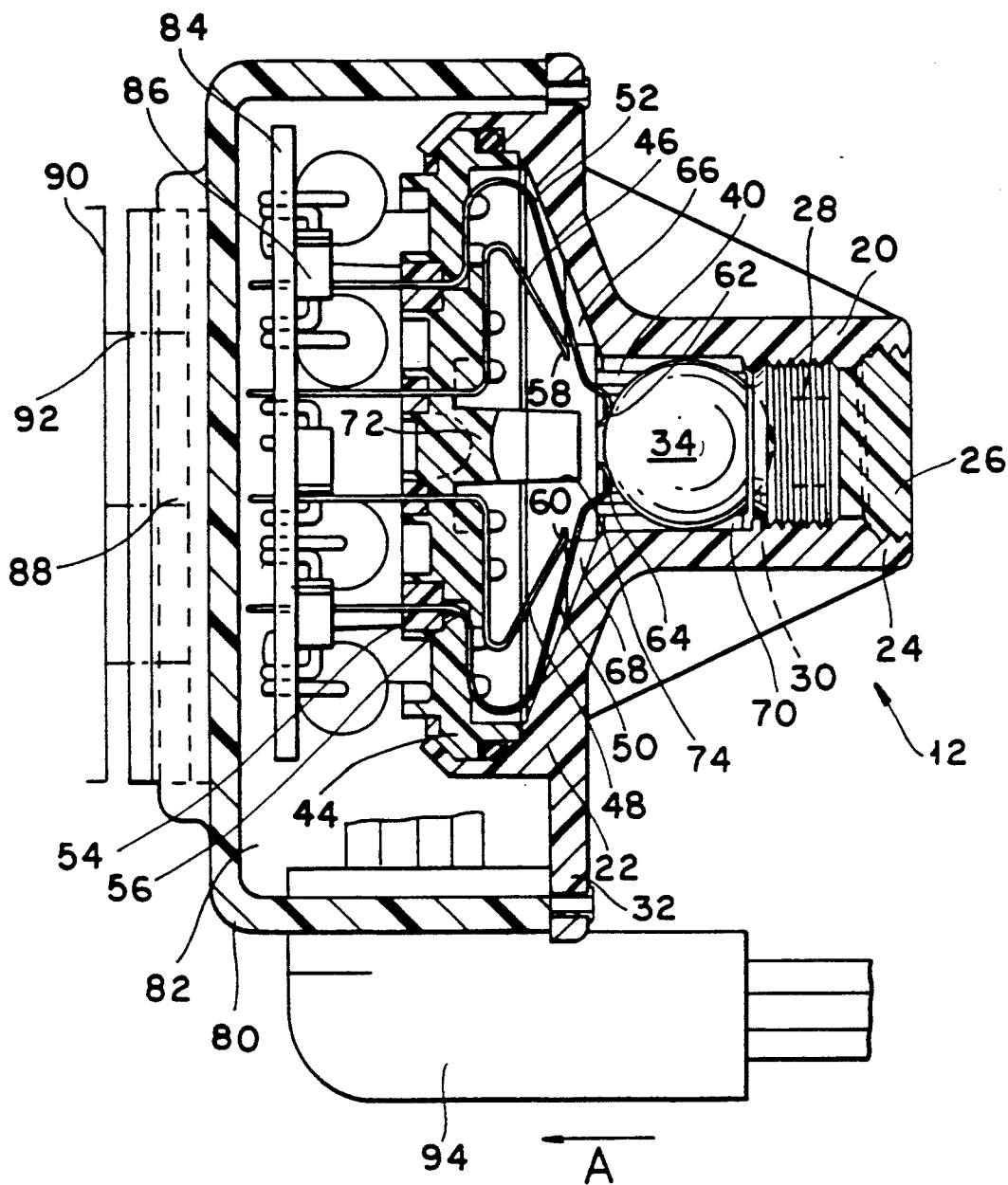
FIG. 2 side elevational view of an accelerometer constructed in accordance with the invention.

Flared end 22 is provided with a peripheral flange 32, and is covered by an axially disposed retainer 44. Retainer 44 may be attached to portion 20 by any well known means such as with an adhesive or by crimping. Mounted on retainer 44 there are four blades 46, 48, 50 and 52. For the sake of convenience, blades 46 and 48 shall be referred to as the lower blades while blades 50 and 52 shall be referred to as the upper blades. Each of these blades has a straight portion which passes through a hole 56 in retainer 44. Each blade is maintained in place by insulating bushings such as bushings 54, and is made of a relatively thin and flat conductive material such as copper. Lower blades 46 and 48 are terminated at their upper portions with respective curved sections 58 and 60 as shown in FIG. 2. Upper blades 50, 52 extend further radially inward into the passageway 40 of tubular portion 20 and their tips 62, 64 are preferably coated with an insulating material, such as a plastic material. In addition, or alternatively, ball 34 may be covered by an insulating material.

Disposed within portion 20, there are shoulders 66, 68 for presetting the blades 46, 48, to the positions shown in FIG. 2.

Passageway 40 is defined by a plurality of ribs such as 70 constructed and arranged to guide ball 30 therethrough without any substantial aero dynamic damping. Mounted on retainer 44, there is a stop 72 with an inner spherical surface 74 in opposed relation to surface 30. The surfaces 74 and 30 have radii of curvature equal to the radius of ball 34.

Secured to flange 32, there is an outer cap 80 which defines a chamber 82 with flange 32 and inner retainer 44. Within chamber 82, there can be a printed circuit board 84 used to mount various circuit elements such as resistors 86. Blades 46, 48, 50, 52 extend to board 84 as shown. Cap 80 has a mounting tab 88 for mounting sensor 10 on the fire wall 90 of a motor vehicle, through insulating pad 92.

A plug 94 connected through cap 80 is used to couple the board 84 to sensor 12 as well as to provide power.

Figure 3:
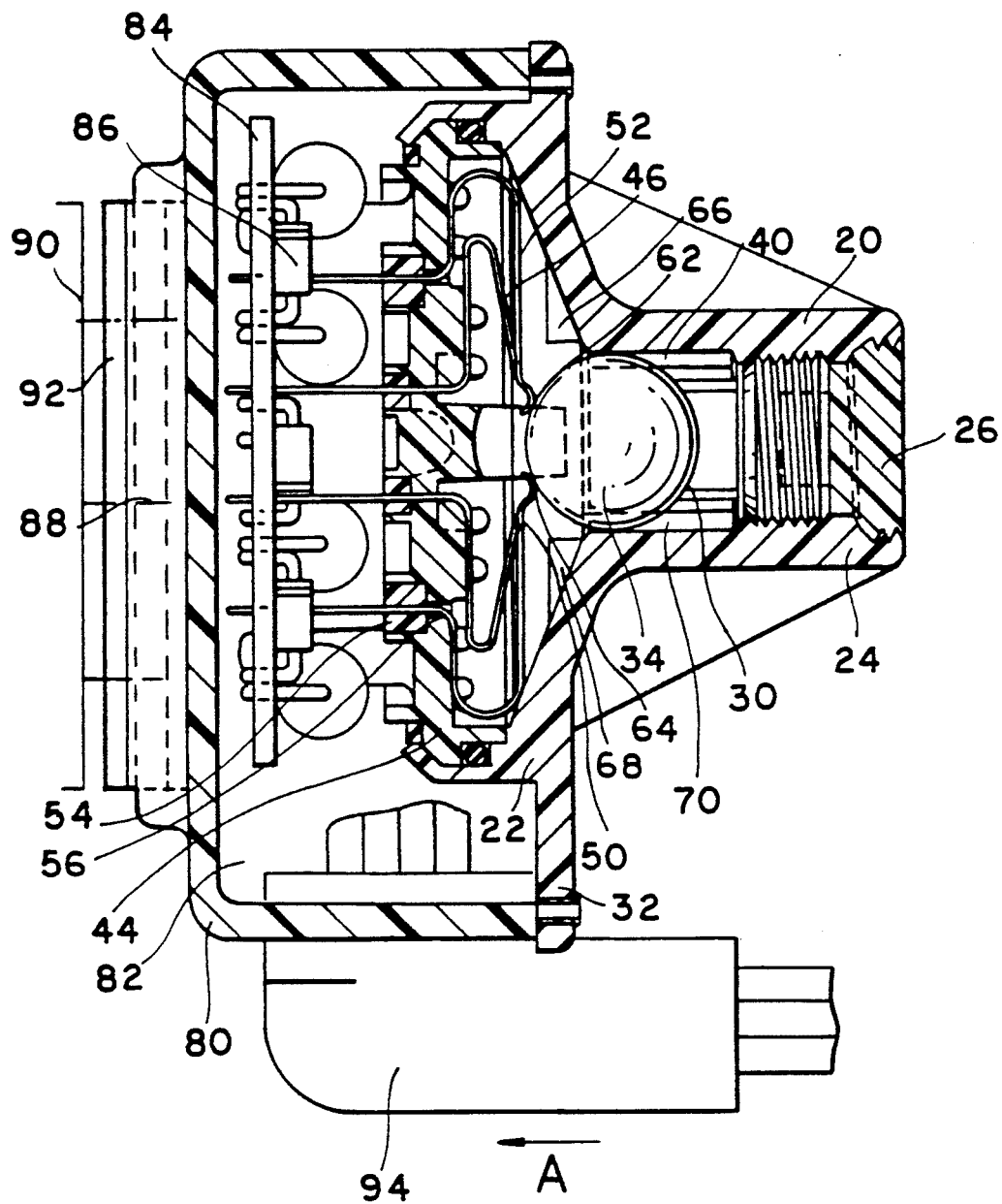
FIG. 3 shows the sensor of FIG. 2 with its contacts closed.

The sensor 12 operates in the following manner. Safing sensor 12 can be mounted, for example, on the fire wall or passenger compartment of a vehicle while the primary sensor 14 may be mounted either in the passenger compartment or in the crush zone. Upper blades 50, 52 are arranged and constructed to bias ball 34 against wall 30 as shown in FIG. 2. The sensor 12 is positioned in such an orientation that, if the vehicle experiences a deceleration, ball 34 is urged in the direction indicated by arrow A in FIG. 2. If this deceleration is greater than a preselected threshold level (defined by the biasing force of blades 50, 52) the force of deceleration overcomes the biasing force and the ball 34 is projected in direction A along the passageway 40. Initially, the ball 34 is in contact with the tips of the upper blades 50, 52. As the ball moves in the direction A, it bends blades 50, 52 in the same direction until these blades come into contact with the curved sections 58, 60, as shown in FIG. 3. An electrical path is then formed between blades 48, 50 and another electrical path between blades 46 and 52. These electrical paths may be used to generate electrical signals which may be sent, for example, from the conductors of plug 94 to sensor 12 as described above.

Figure 4:
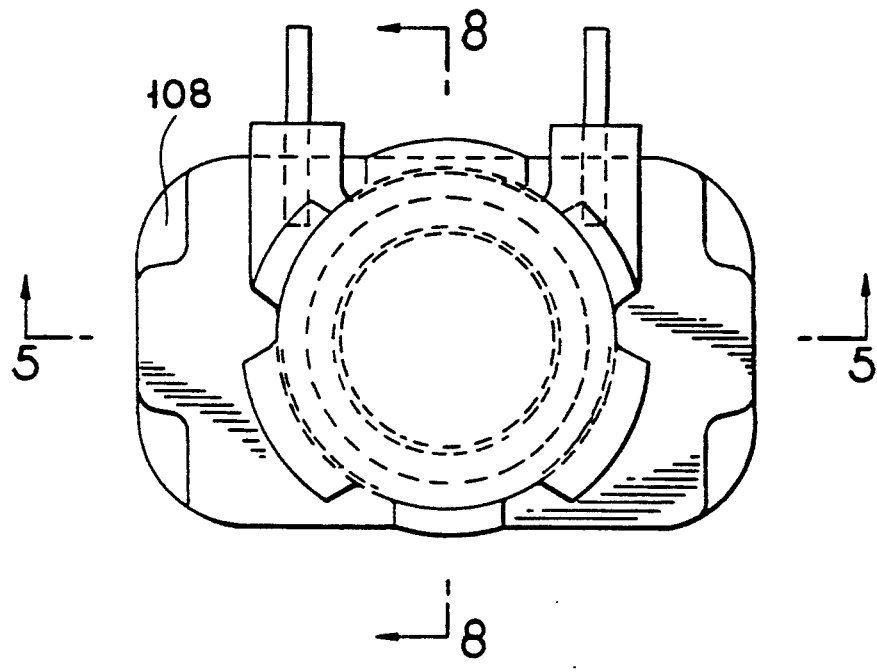
FIG. 4 shows a top view of an alternate embodiment.

FIGS. 4–8 show a different embodiment of a safing sensor which is biased magnetically rather than mechanically. More specifically, safing sensor 100 includes a housing 102 made up of two portions: an elongated tubular portion 104 and a base portion 106. The base portion may be rounded at the corners as at 108 (FIG. 4). Housing 102 is made of a plastic or non-magnetic metallic material. Base 106 is terminated at one end by a retainer 110 made of a material similar to housing 102.

Figure 5:
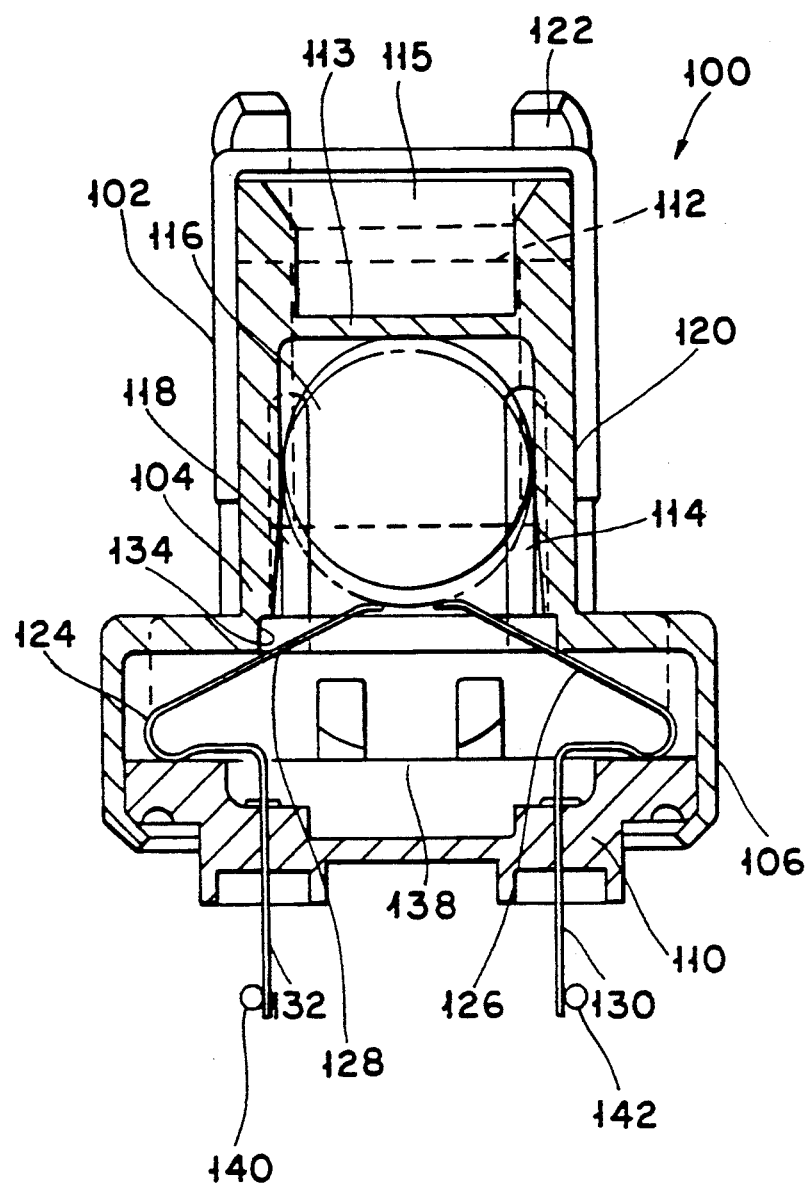
FIG. 5 shows a side elevational view of the embodiment of FIG. 4.
Figure 7:
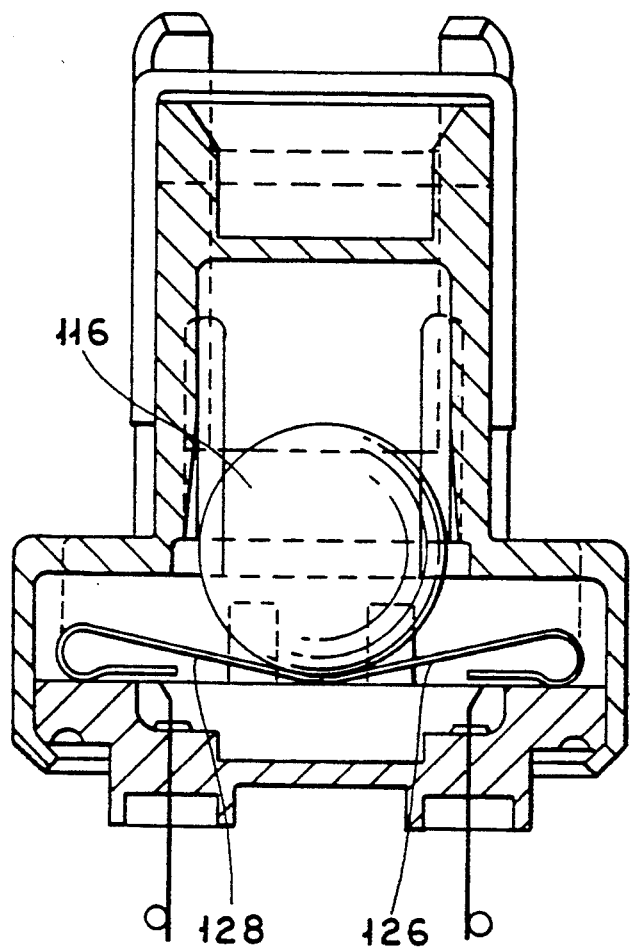
FIG. 7 shows a side elevational view similar to FIG. 5 with inertial mass moved in response to a deceleration.

Inside, housing portion 104 is divided into two coaxially arranged chambers 112, 114 by a wall 113. Chamber 112 houses a permanent magnet 115. Chamber 114 defines a path of movement for an inertial element in the shape of a ball 116. The ball is preferably made of a magnetizable material and its surface is electrically conductive. Chamber 114 is also provided with a plurality of longitudinal ribs 118 which define a path of movement for ball 116. The ribs are arranged to permit air flow around the ball 116 as the ball moves through the housing to insure that the ball movement is substantially undamped. Disposed around housing portion 104 there is a member 120. As shown in FIG. 5 member 120 extends only part way along housing portion 104 so that it does not overlap housing portion 106. This member 120 is made of a magnetizable material and is used to concentrate the magnetic field generated by magnet 112 to chamber 114. In this manner, the size of the magnet, and therefore the size of the sensor can be minimized. This member is described in more detail in U.S. application Ser. No. 418,147 filed Oct. 6, 1989, now abandoned. Member 120 can be held in place on housing portion 104 by tabs 122.

Housing portion 106 defines another chamber 124. Inside this chamber 124 there are two contact blades 126, 128. Blades 126, 128 are made of flexible, electrically conductive material. Each blade is secured to retainer 110 by straight portions 130, 132. Chamber 124 is in communication with chamber 114 as shown. At the interface between these two chambers there is a cylindrical shoulder 134. Blades 126, 128 are shaped so that they are normally biased against the shoulder 134. In this manner the position of the blades is preset in a manner similar to the one described in U.S. application Ser. No. 417,914 filed Oct. 6, 1989, now U.S. Pat. No. 5,011,182. Also within chamber 124, mounted on cap 110 is a stop 138 which defines the end of travel of ball 116.

Figure 6:
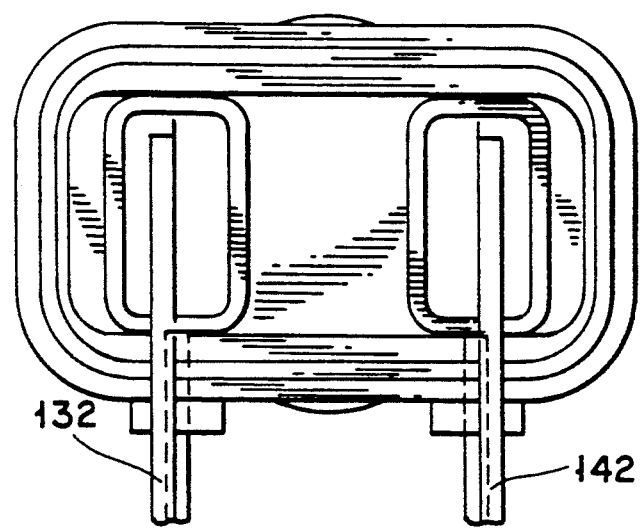
FIG. 6 shows a bottom view of the embodiment of FIG. 5.
Figure 8:
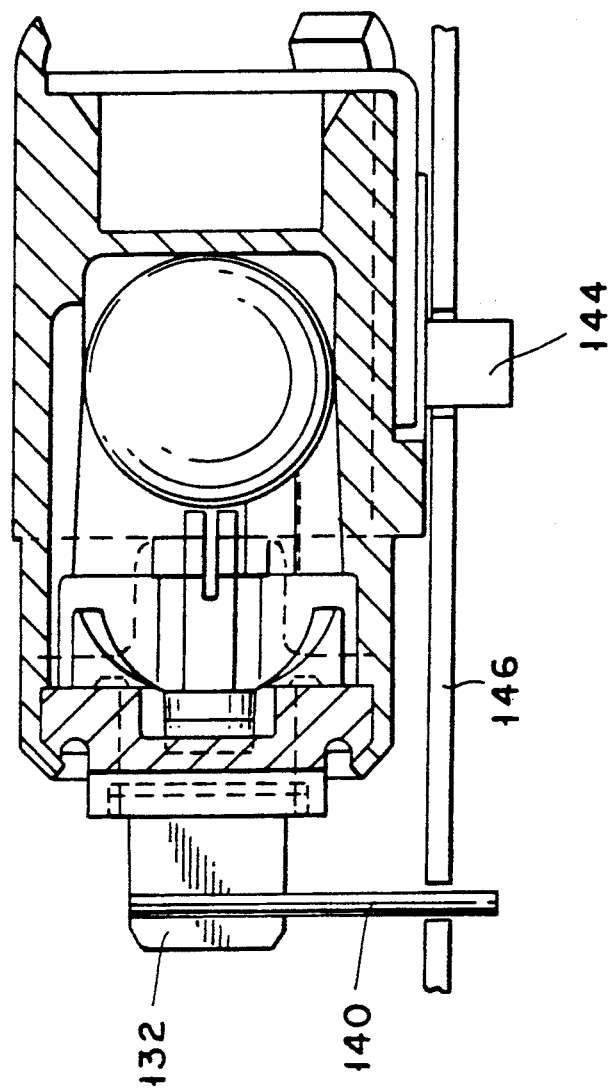
FIG. 8 shows a partial side elevational view of a diagnostic sensor mounted on a printed circuit board.

As shown in more detail in FIGS. 5, 6 and 8, blades 126, 128 extend through retainer 110 and are connected at their outer ends 130, 132 to wires 140, 142 disposed, for example, perpendicularly to the blades. In addition, housing 102 is also provided with a mounting leg 144 extending in parallel with wires 140, 142. As shown in FIG. 8, these elements are used to mount the sensor 100 on a printed circuit board 146. Preferably wires 140, 142 are connected to conductors (not shown) on the board 146, while leg 144 is used to support the sensor on the board 146. Board 146 holds other electronic components used for controlling the inflator device 16 and air bag 18. In addition, the primary or discriminating sensor 14 may also be mounted on board 146.

In operation, inertial mass or ball 116 normally is biased against wall 113 by magnet 115. When the motor vehicle is involved in a crash, ball 116 moves away from wall 113 toward stop 138. When the ball touches the tips of contact blades 130 132 an electrical path is established from one blade through the ball to the second blade thereby indicating that a crash has occurred. This action causes a signal to be applied to the discriminating sensor which determines whether the passenger restraint system should be deployed.

Obviously, numerous modifications may be made to the invention without departing from its scope as defined in the appended claims.

We claim:

1. An acceleration sensor comprising;
   a housing formed of a first wall and a second wall, said first wall having a peripheral flange, said second wall being attached to said peripheral flange, said housing further including a fixed retainer member attached to an end of said first wall to define a first chamber with said first wall and a second chamber with said second wall;
   sensing means disposed in said first chamber for sensing acceleration by moving from a first to a second position;
   electrical circuit means disposed in said first chamber for sensing when said sensing means is in one of said first and second positions;
   a circuit board disposed in said second chamber and coupled electrically to said electrical circuit means; and
   electrical connection means extending into said housing for connection to said circuit board.

2. The acceleration sensor of claim 1 further comprising mounting means for mounting said housing in a motor vehicle.

3. The sensor of claim 2 wherein said mounting means includes an insulating member for insulating said housing from said motor vehicle.

4. An acceleration sensor comprising;
   a housing consisting of a first housing member having a peripheral flange and a first housing member end, and a second housing member attached to said flange and cooperating with said first housing member to define a housing interior;
   a retainer member affixed to said first housing member end to partition said housing interior into a first and a second chamber;
   a plurality of blades mounted on said retainer member and extending into said first chamber;
   a mass disposed in said first chamber along a path of travel;
   biasing means for biasing said mass toward a first position, said mass being arranged to move along said path of travel to a second position for establishing an electrical path through said blades in response to an acceleration; and
   a printed circuit board with printed circuit elements disposed in said second chamber, said blades being connected to said printed circuit board.

5. The sensor of claim 4 wherein said blades extend from said circuit board through said retainer member.

6. The sensor of claim 4 wherein said biasing means consists of a spring member for biasing said mass.

7. The sensor of claim 4 wherein said mass is made of a magnetic material and said biasing means includes a magnet disposed in said housing to generate a magnetic field for said mass.

8. The sensor of claim 4 further comprising mounting means for mounting said housing on a motor vehicle wall.

9. The sensor of claim 8 wherein said mounting means includes an insulating pad for isolating said sensor from said motor vehicle wall.

10. The sensor of claim 4 wherein said mass is undamped.

11. The accelerometer of claim 1 wherein said housing includes a first housing member having a generally cylindrical wall with an inner wall surface defining a path of movement for said sensing means.

12. The accelerometer of claim 4 wherein said first housing member having a generally cylindrical wall with an inner wall surface defining a path of movement for said sensing means.

* * * * *